(12) United States Patent
Morita et al.

(10) Patent No.: US 11,007,806 B2
(45) Date of Patent: May 18, 2021

(54) METHOD FOR COATING INKS, METHOD FOR PRODUCING WALLPAPER, IMAGE FORMING SET, IMAGE FORMING SYSTEM, INK, AND INK SET

(71) Applicants: Yoshihiro Moriya, Shizuoka (JP); Akihiko Gotoh, Kanagawa (JP)

(72) Inventors: Tatsuya Morita, Tokyo (JP); Yoshihiro Moriya, Shizuoka (JP); Akihiko Gotoh, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 18 days.

(21) Appl. No.: 16/314,931

(22) PCT Filed: Jul. 3, 2017

(86) PCT No.: PCT/JP2017/024322
§ 371 (c)(1),
(2) Date: Jan. 3, 2019

(87) PCT Pub. No.: WO2018/008588
PCT Pub. Date: Jan. 11, 2018

(65) Prior Publication Data
US 2019/0210389 A1 Jul. 11, 2019

(30) Foreign Application Priority Data

Jul. 7, 2016 (JP) .............................. JP2016-135237
Sep. 5, 2016 (JP) .............................. JP2016-172721

(51) Int. Cl.
*B41M 3/18* (2006.01)
*B41M 5/00* (2006.01)
(Continued)

(52) U.S. Cl.
CPC ............ *B41M 3/18* (2013.01); *B41M 5/0023* (2013.01); *C09D 11/322* (2013.01); *C09D 11/36* (2013.01);
(Continued)

(58) Field of Classification Search
CPC ............. B41M 5/0011; B41M 5/0017; B41M 5/0023; B41M 5/0047; B41M 7/00;
(Continued)

(56) References Cited

U.S. PATENT DOCUMENTS 6,800,340 B1 * 10/2004 Francescutti ........ B41M 5/0047
347/105
8,747,969 B2 * 6/2014 Lu ........................... B41M 5/00
347/102

(Continued)

FOREIGN PATENT DOCUMENTS

EP 0304550 A2 3/1989
EP 2105476 A2 9/2009
(Continued)

OTHER PUBLICATIONS

International Search Report dated Sep. 13, 2017 for counterpart International Patent Application No. PCT/JP2017/024322 filed Jul. 3, 2017.

(Continued)

*Primary Examiner* — Manish S Shah
(74) *Attorney, Agent, or Firm* — Oblon, McClelland, Maier & Neustadt, L.L.P.

(57) ABSTRACT

Provided is a method for coating inks, the method including coating a plurality of kinds of inks on a target by an inkjet method individually, wherein the target includes a base and a gel layer provided on the base and containing a vinyl chloride resin and a plasticizer, wherein the plurality of kinds of inks are oil-based inks and include an ink x and an
(Continued)

ink y that is to be discharged after the ink x is discharged, and wherein an interpenetration ratio Pxy of the inky to the ink x is 7.0% or greater but 13.0% or less.

16 Claims, 3 Drawing Sheets (51) Int. Cl.
*C09D 11/322* (2014.01)
*C09D 11/36* (2014.01)
*C09D 11/40* (2014.01)
*D21H 27/20* (2006.01)
*B41M 5/52* (2006.01)

(52) U.S. Cl.
CPC ............ *C09D 11/40* (2013.01); *D21H 27/20* (2013.01); *B41M 5/0047* (2013.01); *B41M 5/0064* (2013.01); *B41M 5/5254* (2013.01)

(58) Field of Classification Search
CPC .... B41M 7/0072; B41M 5/52; B41M 5/5218; B41M 5/5227; B41J 2/04588; B41J 2/04595; B41J 2/04586; B41J 2/14274; B41J 2/1433; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598
See application file for complete search history.

(56) References Cited

U.S. PATENT DOCUMENTS

| | | |
|---|---|---|
| 2009/0235843 A1 | 9/2009 | Sugita et al. |
| 2013/0267627 A1* | 10/2013 | Kito ........................ C09D 11/54 522/168 |
| 2013/0303640 A1 | 11/2013 | Kim et al. |
| 2018/0320320 A1 | 11/2018 | Moriya et al. |

FOREIGN PATENT DOCUMENTS

| | | | | |
|---|---|---|---|---|
| EP | 2666819 A2 | 11/2013 | | |
| JP | 10-264501 A | 10/1998 | | |
| JP | 2000-318038 | 11/2000 | | |
| JP | 2000318038 A | * 11/2000 | ............. | B41M 5/00 |
| JP | 2010-105364 | 5/2010 | | |
| JP | 4897848 B2 | 1/2012 | | |
| JP | 2013-159648 A | 8/2013 | | |
| JP | 2015-229241 A | 12/2015 | | |
| JP | 2017-105162 | 6/2017 | | |
| WO | WO2017/090222 A1 | 6/2017 | | |

OTHER PUBLICATIONS

Written Opinion dated Sep. 13, 2017 for counterpart International Patent Application No. PCT/JP2017/024322 filed Jul. 3, 2017.
Japanese Office Action dated Jun. 16, 2020, in Japanese Patent Application No. 2016-172721.

* cited by examiner

METHOD FOR COATING INKS, METHOD FOR PRODUCING WALLPAPER, IMAGE FORMING SET, IMAGE FORMING SYSTEM, INK, AND INK SET

TECHNICAL FIELD

The present invention relates to a method for coating inks, a method for producing a wallpaper, an image forming set, an image forming system, an ink, and an ink set.

BACKGROUND ART

Hitherto, sheet-like wallpapers having good designs have been used on buildings' internal walls and ceilings.

These wallpapers are typically formed of noninflammable base paper or noninflammable non-woven fabric from the viewpoints of an adhesive property on wall surfaces, non-inflammability, and fireproofness. Further, these wallpapers have scratch-resistant, stainproof resin layers on the surfaces.

The resin layers are formed of polyvinyl chloride-based resins containing plasticizers mainly formed of ester oils. Furthermore, it has been widely known to further add foaming agents to the resin layers to foam the resin layers and impart flexibility to the resin layers, or to emboss the resin layers to impart stereoscopic decorations to the resin layers.

In recent years, attempts have been made to print desired images on the resin layers by inkjet methods and apply the resin layers to the wallpapers. However, there is a problem that the polyvinyl chloride-based resins contained in the resin layers have a significantly poor ink absorbability due mainly to the materials' properties.

Hence, there is proposed an embossed wallpaper producing method of additionally providing an ink receiving layer as the upper layer of the resin layer formed of a vinyl chloride resin, to promote permeation and fixing of an ink (see, e.g., PTL 1).

As inks used for printing images, oil-based inks have been used. Advantages of the oil-based inks include a high image density attributable to solubility/dispersibility of coloring materials at high densities, a good water resistance, and a good anti-clogging property in head nozzles of inkjet apparatuses. Particularly, in recent years, excellent light resistance and ozone resistance of the oil-based inks have brought the oil-based inks to be widely used on wallpapers for large-sized POP arts, advertisements, and displays.

For example, there is proposed a semi-gloss oil-based inkjet print sheet formed of a support and an overlying oil-based ink receiving layer mainly formed of a vinyl chloride-acrylic resin copolymer having a glass transition temperature prescribed within a desired range (see, e.g., PTL 2).

CITATION LIST

Patent Literature

[PTL 1] Japanese Unexamined Patent Application Publication No. 2000-318038
[PTL 2] Japanese Patent No. 4897848

SUMMARY OF INVENTION

Technical Problem

The present invention has an object to provide a method for coating inks, where the method can provide an image with a high image density and an excellent chromogenic property when printing the image on a target such as a wallpaper with a plurality of kinds of inks having a good ink droplet spreadability on the target.

Solution to Problem

According to one aspect of the present invention, a method for coating inks of the present invention is a method for coating a plurality of kinds of inks on a target by an inkjet method individually. The target includes a base and a gel layer provided on the base and containing a vinyl chloride resin and a plasticizer. The plurality of kinds of inks are oil-based inks and include an ink x and an ink y that is to be discharged after the ink x is discharged. An interpenetration ratio Pxy of the ink y to the ink x is 7.0% or greater but 13.0% or less.

Advantageous Effects of Invention

The present invention can provide a method for coating inks, where the method can provide an image with a high image density and an excellent chromogenic property when printing the image on a target such as a wallpaper with a plurality of kinds of inks having a good ink droplet spreadability on the target.

DESCRIPTION OF EMBODIMENTS (Method for Coating Inks and Method for Producing Wallpaper)

A method for coating inks of the present invention is a method for coating a plurality of kinds of inks on a target by an inkjet method individually. The target includes a base and a gel layer provided on the base and containing a vinyl chloride resin and a plasticizer. The plurality of kinds of inks are oil-based inks and include an ink x and an ink y that is to be discharged after the ink x is discharged. An interpenetration ratio Pxy of the ink y to the ink x is 7.0% or greater but 13.0% or less. The method further includes other steps as needed.

The method for coating inks of the present invention is based on the following finding. When oil-based inks are used in existing methods for producing embossed wallpapers, there is a problem that oil-based inks, most of which are non-volatile, have an extremely poor permeation/absorption property on the ink receiving layers. The method for coating inks of the present invention is also based on the following finding. Existing semi-gloss oil-based inkjet print sheets additionally need a step of forming an ink receiving layer to make the process complicated.

A method for producing a wallpaper of the present invention is the method for coating inks of the present invention where the target is a wallpaper. The method preferably includes a heating step and an embossing step and further includes other steps as needed.

—Target—

The target includes a base and a gel layer provided on the base and containing a vinyl chloride resin and a plasticizer, and further includes other layers as needed.

As a characteristic of the target, it is preferable that when a free induction decay curve obtained by measuring the target by a pulse NMR method is decomposed to 2 curves attributed to a hard component and a soft component, the ratio of the hard component be in a range of 35% or greater but 40% or less. Further, it is preferable that a spin-spin relaxation time obtained by measuring the soft component by a Hahn echo method be 30.0 ms or longer but 45.0 ms or shorter.

When the ratio of the hard component and the spin-spin relaxation time of the soft component are in the ranges described above, liquid droplets of an ink landing on the target can satisfy both of a good wetting/spreading property and a good absorption property and can form an image having a good image density with slight ink bleed. A good image density means that beading can be suppressed.

It is preferable that the target have a good affinity with the oil-based inks and have a state of being capable of quickly absorbing the inks into the inside of the target. This performance is influenced by the fluidic state (molecular mobility) of the plasticizer contained in the gel layer of the target. When the spin-spin relaxation time, measured by the Hahn echo method, of the soft component obtained by the pulse NMR method is longer than 45.0 ms during printing on the target, the oil-based inks have a poorer wetting/spreading property and tend to form an image having a low image density and a poor solid coverage.

The reason for this result is considered as follows. An increased molecular mobility of the plasticizer in the gel promotes absorption of the landed inks into the gel, but in turn inhibits wetting/spreading of the ink in the horizontal direction. When the relaxation time is shorter than 30.0 ms, absorption of the landed inks into the target is significantly poor. This makes 2 colors likely to bleed (color bleed). In an extreme case, adjoining inks coalesce and attract each other to be repelled, and tend to make the image density extremely poor. The reason for this result is considered as follows. The molecular flow of, for example, the plasticizer is insufficient, to make the landed ink component stop at the surface of the target for long.

The spin-spin relaxation time, measured by the Hahn echo method, of the soft component obtained by measuring the target by the pulse NMR method is adjusted by controlling the state of the gel formed of the vinyl chloride resin and the plasticizer constituting the target. Specifically, it is possible to control the spin-spin relaxation time by varying the heating temperature or the heating time during formation of the gel layer on the base, or by varying the temperature of the target when the oil-based inks contact on the target during inkjet printing.

<Pulse NMR Method>

In the present invention, the pulse NMR measurement of the target can be performed in the manner described below, for example.

With MINISPEC MQ series for pulse NMR available from Bruker Corporation, a high-frequency magnetic field is applied in the form of pulses to the target put in an NMR tube, to tip the magnetization vector. The mobility of the molecules constituting the target is evaluated based on the time (=relaxation time) taken until the x and y components of the magnetization vector disappear.

(1) Sample

For being used for the measurement, the target is weighed out in 0.2 g in an NMR tube having a diameter of 10 mm and heated for 15 minutes in a preheater adjusted to the same heating temperature as in printing. Note that a sample would undergo a significant gel state change and come to have completely different properties if the sample once became higher than the set temperature and then became the predetermined temperature through cooling even though these temperatures are the same heating temperatures. Hence, it is indispensable to start heating the sample after adjusting the preheater to the predetermined temperature.

(2) Measurement Conditions

Hahn echo method

First 90° Pulse Separation; 0.01 msec

Final Pulse Separation; 20 msec

Number of Data Point for Fitting; 40 points

Cumulated number; 32 times

Temperature; the same as the heating temperature in printing (3) Method for Calculating Spin-Spin Relaxation Time ($t2$)

By exponential approximation with ORIGIN 8.5 (available from Origin Lab Corporation), a spin-spin relaxation time ($t2$) is calculated from a decay curve obtained by the Hahn echo method in the pulse NMR measurement. The spin-spin relaxation time is known to be shorter as the molecular mobility is lower and longer as the molecular mobility is higher.

(4) Method for Calculating Spin-Spin Relaxation Times ($tH$, $tS$)

The decay curve obtained by the Hahn echo method in the pulse NMR measurement is a superimposition of relaxation curves attributed to 2 components, namely the hard component having a low molecular mobility and the soft component having a high molecular mobility.

By bi-exponential approximation with ORIGIN 8.5 (available from Origin Lab Corporation), the obtained echo signal is decomposed to 2 relaxation curves attributed to the 2 components. In this way, spin-spin relaxation times ($tH$, $tS$) of the respective components can be calculated.

Figure 1:
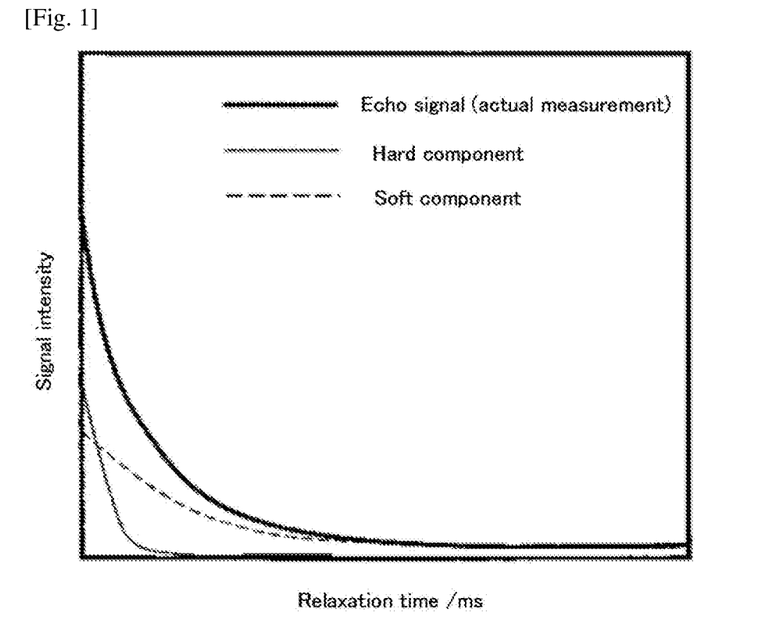
FIG. 1 is a graph plotting 3 relaxation curves including an example of a decay curve, and relaxation curves of a hard component and a soft component obtained by decomposing the decay curve.

FIG. 1 plots 3 relaxation curves including an example of the decay curve, and the relaxation curves of the hard component and the soft component obtained by decomposing the decay curve.

The hard component having a low molecular mobility is typically a component attributable to a hard material, and the soft component having a high molecular mobility is attributable to a soft material.

The spin-spin relaxation time is known to be shorter as the molecular mobility is lower and longer as the molecular mobility is higher.

Hence, it can be said that of the 2 relaxation curves resulting from the decomposition, the relaxation curve having a shorter spin-spin relaxation time represents the hard component, and the relaxation curve having a longer spin-spin relaxation time represents the soft component.

The target is not particularly limited, may be appropriately selected depending on the intended purpose, and is preferably a wallpaper.

—Base—

The base is not particularly limited and may be appropriately selected depending on the intended purpose. Examples of the base include plastic film, synthetic paper formed of synthetic fiber, and sheet of non-woven fabric. Among these bases, a base having water resistance is preferable.

When the target is a wallpaper, it is preferable that the base have a mechanical strength and heat resistance suitable as the base of the wallpaper.

The base used for the wallpaper is not particularly limited and may be appropriately selected depending on the intended purpose. Examples of the base include paper such as natural paper and synthetic paper, plastic film, non-woven fabric, fabric, wood, and metallic thin film.

Examples of the plastic film include: polyester film; polypropylene film; polyethylene film; plastic film of, e.g., nylon, vinylon, and acrylic; and products obtained by pasting these films together.

The plastic film is not particularly limited, may be appropriately selected depending on the intended purpose, and is preferably uniaxially or biaxially stretched in terms of strength.

The non-woven fabric is not particularly limited and may be appropriately selected depending on the intended purpose. Examples of the non-woven fabric include non-woven fabric obtained by scattering polyethylene fibers in a sheet-like form and bonding the fibers by thermocompression bonding into a sheet shape.

—Gel Layer—

The gel layer contains a vinyl chloride resin and a plasticizer, and further contains a foaming agent, a filler, a dispersant, a defoaming agent, an antiblocking agent, a thickener, and other components as needed.

—Vinyl Chloride Resin—

The vinyl chloride resin is a general-purpose resin excellent in physical or chemical properties, and less expensive than other resins.

Examples of the vinyl chloride resin include soft vinyl chloride resins, semi-hard vinyl chloride resins, and hard vinyl chloride resins. One of these vinyl chloride resins may be used alone or two or more of these vinyl chloride resins may be used in combination.

The content of the vinyl chloride resin is preferably 20% by mass or greater but 60% by mass or less and more preferably 30% by mass or greater but 50% by mass or less of the total amount of the gel layer.

—Plasticizer—

The plasticizer is not particularly limited and may be appropriately selected depending on the intended purpose. Examples of the plasticizer include: phthalic acid ester-based plasticizers such as dinonyl phthalate (DNP), dioctyl phthalate (DOP, with HSP $\delta P$ of 24.8 $MPa^{1/2}$), didecyl phthalate (DDP), diisodecyl phthalate (DIDP, with HSP $\delta P$ of 14.7 $MPa^{1/2}$), diisononyl phthalate (diisononyl phthalate, DINP), ditridecyl phthalate (DTDP), and n-hexyl-n-decyl phthalate (NHDP); phosphoric acid ester-based plasticizers such as tri-2-ethylhexyl phosphate (TOP); adipic acid ester-based plasticizers such as didecyl adipate (DDA) and diisodecyl adipate (DIDA); trimellitic acid ester-based plasticizers such as trioctyl trimellitate (TOTM) and tri-n-octyl-n-decyl trimellitate (nonyl DTM); polyester-based plasticizers; epoxy-based plasticizers; sebacic acid ester-based plasticizers; azelaic acid ester-based plasticizers; citric acid ester-based plasticizers; glycolic acid-based plasticizers; ricinoleic acid-based plasticizers; maleic acid ester-based plasticizers; fumaric acid ester-based plasticizers; pyromellitic acid ester-based plasticizers; and itaconic acid ester-based plasticizers. One of these plasticizers may be used alone or two or more of these plasticizers may be used in combination.

It is possible to introduce the plasticizer into the gel layer by making the plasticizer coexist with the vinyl chloride resin during coating, so the plasticizer may be capsulated in the gel layer during gelation. In this way, the target having a high affinity with the oil-based inks can be produced.

The Hansen solubility parameter (HSP) polarity term ($\delta P$) of the plasticizer is not particularly limited, may be appropriately selected depending on the intended purpose, and is preferably 12 $MPa^{1/2}$ or greater but 30 $MPa^{1/2}$ or less and more preferably 13.5 $MPa^{1/2}$ or greater but 18.5 $MPa^{1/2}$ or less.

The Hansen solubility parameter polarity term ($\delta P$) can be calculated with software such as a product named: HSPIP.

The content of the plasticizer is preferably 30 parts by mass or greater but 100 parts by mass or less relative to 100 parts by mass of the vinyl chloride resin. When the content of the plasticizer is 30 parts by mass or greater but 100 parts by mass or less, a gel layer in which the vinyl chloride resin is swelled and solvated by the plasticizer can be obtained.

—Foaming Agent—

The foaming agent is not particularly limited, may be appropriately selected depending on the intended purpose, and is preferably a foaming agent commonly used for wallpapers.

Examples of the foaming agents include inorganic foaming agents, organic foaming agents, and microcapsule foaming agents. One of these foaming agents may be used alone or two or more of these foaming agents may be used in combination.

Examples of the organic foaming agents include azodicarboxylic acid amide (ADCA), azobis isobutylnitrile (AIBN), p,p'-oxybisbenzenesulfonyl hydrazide (OBSH), and dinitrosopentamethylene tetramine (DPT).

Examples of the inorganic defoaming agents include inorganic carbonates such as sodium hydrogen carbonate.

—Filler—

Examples of the filler include aluminum hydroxide, magnesium hydroxide, barium hydroxide, calcium carbonate, magnesium carbonate, calcium sulfate, barium sulfate, ferrous hydroxide, basic zinc carbonate, basic lead carbonate, silica sand, clay, talc, silicas, titanium dioxide, and magnesium silicate. Among these fillers, calcium carbonate, magnesium carbonate, aluminum hydroxide, and magnesium hydroxide are preferable.

—Plurality of Kinds of Inks—

The plurality of kinds of inks are oil-based inks, include an ink x and an ink y that is to be discharged after the ink x is discharged, and further include other inks as needed.

—Oil-Based Inks—

The oil-based inks preferably contain an oil constituent (solvent) and a colorant, and more preferably contain a dispersant, a binder resin, and other components as needed.

—Oil Constituent (Solvent)—

The oil constituent (solvent) is not particularly limited, may be appropriately selected depending on the intended purpose, and preferably contains an ester oil as the main component. When the ester oil is the main component of the oil constituent, an image having a good image quality can be formed by performing printing in a heating condition on a gel layer containing a plasticizer, even without a special ink receiving layer for inkjet inks. This has been impossible with existing techniques.

Examples of the oil constituent (solvent) include: phthalic acid esters such as dibutyl phthalate, dicapryl phthalate, diisodecyl phthalate, dioctyl phthalate (DOP), diisononyl phthalate, dioctyl phthalate, butyl-2-ethylhexyl phthalate, and di-2-ethylhexyl phthalate; adipic acid esters such as dioctyl adipate (diethylhexyl adipate: DOA, with HSP $\delta P$ of 17.8 $MPa^{1/2}$) and diisononyl adipate (DINA); sebacic acid esters such as dibutyl sebacate, dioctyl sebacate, and diisononyl sebacate; azelaic acid esters such as dibutyl azelate, dioctyl azelate, and diisononyl azelate; lauric acid esters such as methyl laurate, ethyl laurate, and isobutyl laurate; myristic acid esters such as isopropyl myristate, isocetyl myristate, and octyldodecyl myristate; palmitic acid esters such as isopropyl palmitate and octyl palmitate; octanoic acid esters such as cetyl octanoate, octyl octanoate (ethylhexyl ethylhexanoate: OOE), and isononyl octanoate; and isononylic acid esters such as ethylhexyl isononanoate and isononyl isononanoate. One of these oil constituents may be used alone or two or more of these oil constituents may be used in combination. Among these oil constituents, adipic acid esters such as dioctyl adipate and diisononyl adipate and octanoic acid esters such as octyl octanoate are preferable.

The Hansen solubility parameter polarity term ($\delta P$) of the oil constituent (solvent) is not particularly limited, may be appropriately selected depending on the intended purpose, and is preferably 12 $MPa^{1/2}$ or greater but 30 $MPa^{1/2}$ or less and more preferably 13.5 $MPa^{1/2}$ or greater but 18.5 $MPa^{1/2}$ or less.

The Hansen solubility parameter polarity term ($\delta P$) can be calculated with software such as a product named: HSPIP.

The content of the oil constituent (solvent) is preferably 30% by mass or greater and more preferably 50% by mass or greater but 90% by mass or less of the total amount of the inks. When the content of the oil constituent is 30% by mass or greater, image qualities can be improved.

—Colorant—

The colorant is not particularly limited and may be appropriately selected depending on the intended purpose. Examples of the colorant include: pigments such as carbon black, azo-based pigments, phthalocyanine-based pigments, nitroso-based pigments, nitro-based pigments, built dye-based pigments, mordant dye-based pigments, basic dye-based pigments, acid dye-based pigments, and natural dye-based pigments: and oil colors such as diazo dyes and anthraquinone-based dyes. One of these colorants may be used alone or two or more of these colorants may be used in combination. Among these colorants, pigments are preferable.

The content of the colorant is preferably 1% by mass or greater but 30% by mass or less and more preferably 5% by mass or greater but 20% by mass or less of the total amount of the inks. When the content of the colorant is 1% by mass or greater but 30% by mass or less, image qualities can be improved.

It is preferable that the oil-based inks have a heating loss of less than 20% by mass when left to stand at 150 degrees C. for 1 hour, from the viewpoints that the inks will not undergo property changes by volatilization and can be printed stably and provide good image qualities by an inkjet method.

<Interpenetration Ratio Pxy>

The plurality of kinds of inks include the ink x and the ink y that is to be discharged after the ink x is discharged. An interpenetration ratio Pxy of the ink y to the ink x is 7.0% or greater but 13.0% or less, preferably 7.5% or greater but 12.0% or less, and more preferably 9.1% or greater but 10.2% or less. When the interpenetration ratio Pxy is 7.0% or greater, the ink x and the ink y do not overlap with each other much, so the colors of the images formed of these inks can have intensities in suitable absorption wavelength ranges, leading to improvement of image qualities. When the interpenetration ratio Pxy is 13.0% or less, the ink y is prevented from spreading too widely on a fixed image of the ink x and from spreading on the surface of a fixed image other than a fixed image of an ink intended to be overlapped by the ink y in printing in actual use, resulting in suppression of saturation degradation due to mixing of an unintended color, leading to improvement of image qualities. When the interpenetration ratio Pxy is 7.0% or greater but 13.0% or less, liquid droplets of the inks can spread well, the chromogenic property of secondary colors can be good, and an image having good image qualities can be formed. Even when the target is a wallpaper, so long as the interpenetration ratio Pxy is 7.0% or greater but 13.0% or less, an image printed on the wallpaper can keep good image qualities even if the wallpaper is heated and embossed after printing.

The interpenetration ratio Pxy will be described in detail with reference to FIG. 2A to FIG. 2E and FIG. 3.

Figure 2A:
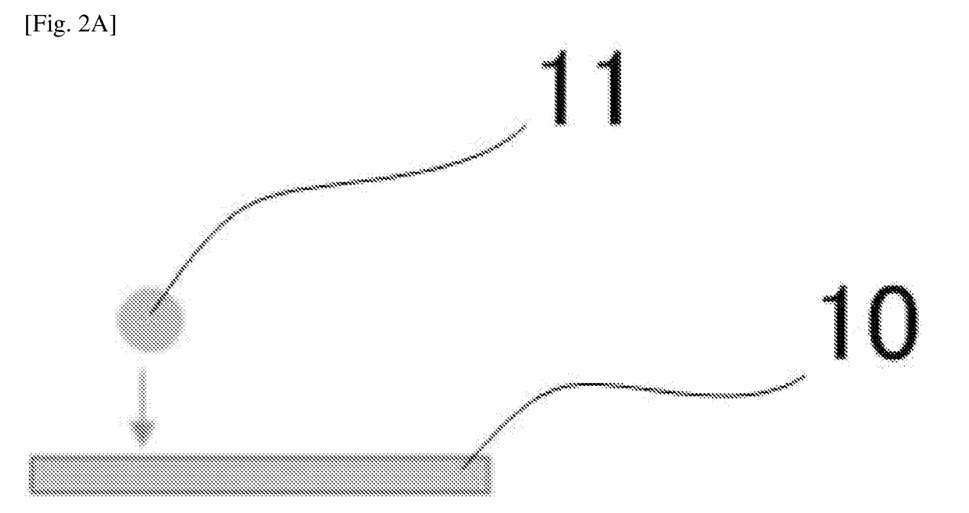
FIG. 2A is an exemplary view illustrating an example in which a liquid droplet of a cyan ink, defined as an ink x, is applied on a target.
Figure 2B:
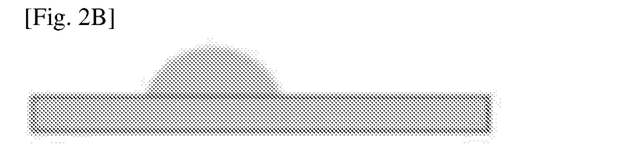
FIG. 2B is an exemplary view illustrating an example in which the cyan ink is absorbed into and fixed on the target.
Figure 2C:
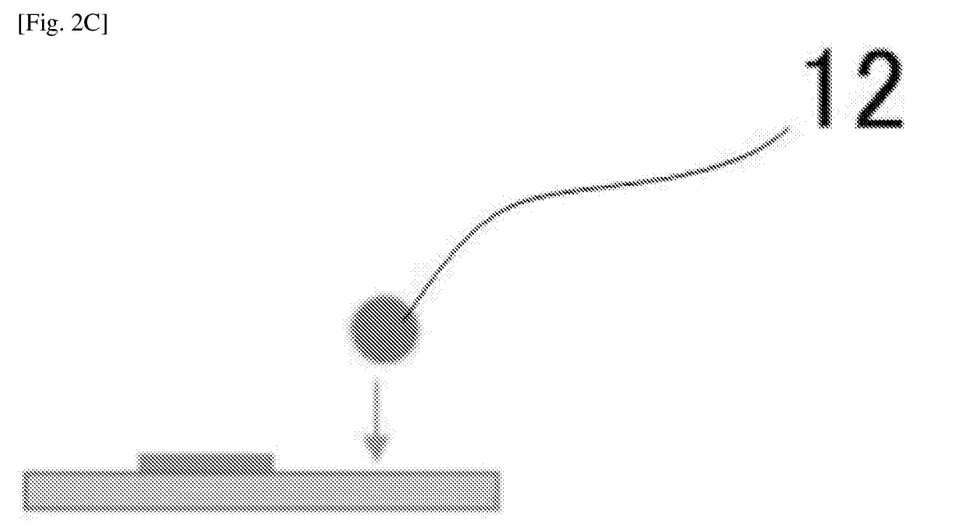
FIG. 2C is an exemplary view illustrating an example in which a liquid droplet of a magenta ink, defined as an ink y, is applied on an edge of a position to which the cyan ink is applied.
Figure 2D:
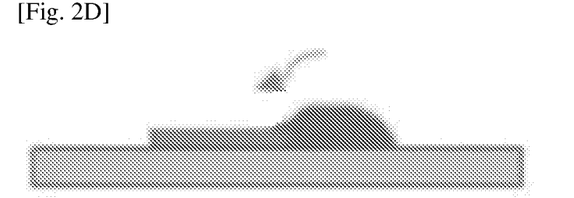
FIG. 2D is an exemplary view illustrating an example in which the liquid droplet of the magenta ink is spreading onto the cyan ink-fixed image on the target.
Figure 2E:
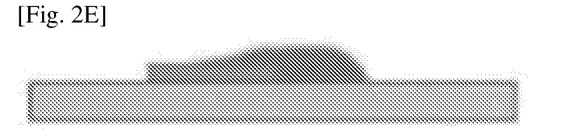
FIG. 2E is an exemplary view illustrating an example in which the liquid droplet of the magenta ink overlaps the cyan ink-fixed image.
Figure 3:
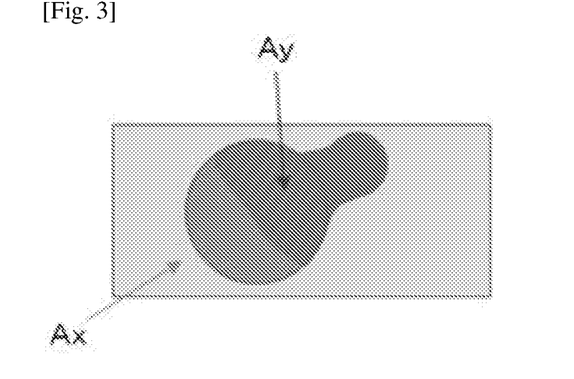
FIG. 3 is a schematic view illustrating an example of the overlapping of the cyan ink- and magenta ink-fixed images.

FIG. 2A to FIG. 2E are exemplary views illustrating a case where a blue image is formed with a cyan ink and a magenta ink. A liquid droplet of a cyan ink 11, defined as the ink x, is applied on the target (FIG. 2A). The cyan ink 11 is absorbed into and fixed on a target 10 (FIG. 2B). When the surface becomes smooth, a liquid droplet of a magenta ink 12, defined as the ink y, is then applied on an edge of the position to which the cyan ink 11 is applied (FIG. 2C). Here, the liquid droplet of the magenta ink 12 is about to spread onto the fixed image of the cyan ink 11 on the target 10 (FIG. 2D). Therefore, the liquid droplet of the magenta ink gradually overlaps the fixed image of the cyan ink (FIG. 2E), to form a blue image (FIG. 3).

The interpenetration ratio Pxy is a value ((Ay/Ax)×100) obtained by dividing an area Ay by an area Ax and expressing the result in percentage, where the area Ax is the area of the fixed image of the cyan ink, of which liquid droplet is fixed first, and the area Ay is the area of the overlapping portion between the fixed images of the liquid droplets of the cyan ink and the magenta ink.

An example of the interpenetration ratio Pxy is presented above using the cyan ink and the magenta ink. This relationship can be established for all secondary color formation patterns. In all combinations of the ink x and the ink y selectable from the plurality of kinds of inks, the interpenetration ratio Pxy is preferably 7.0% or greater but 13.0% or less, more preferably 7.5% or greater but 12.0% or less, and particularly preferably 9.1% or greater but 10.2% or less.

Examples of the combinations of the inks include a case of printing an image of a cyan ink on a fixed image of a magenta ink or a yellow ink; a case of printing an image of a yellow ink on a fixed image of a magenta ink or a cyan ink; and a case of printing an image of a magenta ink on a fixed image of a yellow ink or a cyan ink.

It is preferable that the ink x and the ink y each be any one selected from a cyan ink, a magenta ink, and a yellow ink, and that the ink x and the ink y be different colors.

—Method for Measuring Interpenetration Ratio Pxy—

(1) The target is cut into a square having a size of 3 cm by 3 cm. The position of the intersection of the diagonals is measured, and the intersection of the diagonals is marked with a pencil.

(2) The target is pasted on a hot plate (apparatus name: ND-1, available from AS ONE Corporation) heated to 150 degrees C. with a heat-resistant double-face seal (product name: KAPTON No. 7602, available from Teraoka Seisakusho Co., Ltd.), and left to stand for 1 minute.

(3) Next, the ink x, which is to serve as the foundation of an image, is weighed out in 30 microliters with a micropipette (product name: NICHIPET PREMIUM 100, available from Nichiryo Co., Ltd.) and dropped onto the position marked in (1) above. After the dropped ink x is left to stand for 10 seconds, any unfixed amount of the ink x is wiped with a non-woven fabric wiper (product name: BEMCOT, available from Asahi Kasei Corporation). Then, the rim of the position to which the liquid droplet of the ink x is applied is marked with a pencil.

(4) Next, the ink y (5 microliters) is dropped with a micropipette (product name: NICHIPET PREMIUM 100, available from Nichiryo Co., Ltd.) onto an arbitrary position on the circle marked as the rim of the position to which the ink x is applied. After the dropped ink y is left to stand for 10 seconds, any unfixed amount of the ink y is wiped in the same manner as in (3) above, to obtain a fixed image of the ink x and the ink y.

(5) With a confocal microscope (apparatus name: FV3000, available from Olympus Corporation) and accessory image analyzing software, the area Ax of the ink x marked with a pencil and the area Ay of the portion where the ink x and the ink y overlap each other are measured. The area Ay is divided by the area Ax, and the obtained value is expressed in percentage, to obtain the interpenetration ratio Pxy.

—Dispersant—

The dispersant can adjust the surface tension of the inks. This makes it possible to improve permeability of the inks into the target.

The dispersant is not particularly limited and may be appropriately selected depending on the intended purpose. Examples of the dispersant include polyamide, polyurethane, polyester, polyurea, epoxy resins, polycarbonate, urea resins, melamine resins, phenol resins, polysaccharides, gelatin, gum Arabic, dextran, casein, proteins, natural rubbers, carboxypolymethylene, polyvinyl alcohol, polyvinyl pyrrolidone, polyvinyl acetate, polyvinyl chloride, polyvinylidene chloride, cellulose, ethyl cellulose, methyl cellulose, nitro cellulose, hydroxyethyl cellulose, cellulose acetate, polyethylene, polystyrene, polymers or copolymers of (meth)acrylic acid, polymers or copolymers of (meth)acrylic acid esters, (meth)acrylic acid-(meth)acrylic acid ester copolymers, styrene-(meth)acrylic acid copolymers, styrene-maleic acid copolymers, sodium alginate, fatty acids, paraffin, beeswax, privet, hydrogenated beef tallow, carnauba wax, albumin, and copolymers of these dispersants. One of these dispersants may be used alone or two or more of these dispersants may be used in combination. Among these dispersants, nitrogen atom-containing resin-based dispersants such as polyamide are preferable.

As the dispersant, a commercially available product may be used. Examples of the commercially available product include a product named: SOLSPERSE 11200 and a product named: SOLSPERSE 13940 (both available from Lubrizol Japan Limited). One of these commercially available products may be used alone or two or more of these commercially available products may be used in combination.

The content of the dispersant is preferably 3% by mass or greater but 7% by mass or less and more preferably 4% by mass or greater but 5% by mass or less of the total amount of the inks. When the content of the dispersant is 3% by mass or greater but 7% by mass or less, the dispersant can prevent aggregation of the dispersed colorant, a representative example of which is a pigment, and can improve dispersion stability.

<Difference Between Hansen Solubility Parameter Polarity Terms of Plasticizer and Solvent in Inks>

The difference between the Hansen solubility parameter (HSP) polarity term ($\delta P$) of the plasticizer in the gel layer of the target and the Hansen solubility parameter (HSP) polarity term ($\delta P$) of at least one solvent in the inks is preferably 15 $MPa^{1/2}$ or less and more preferably 5 $MPa^{1/2}$ or less. When the difference is 15 $MPa^{1/2}$ or less, the wetting/spreading property of the inks on the target can be improved.

<Wetting/Spreading Property of Inks and Image Qualities>

When an image is formed with 2 or more inks containing the solvent, in order to prevent a poor image quality, there is a need to not only impart a good wetting/spreading property to the inks on the base but also impart a wetting/spreading property to the liquid droplets of one of the inks on the fixed surface of the liquid droplets of any other of the inks. As described above, a wetting/spreading property between the base and the inks for obtaining good image qualities can be obtained with the use of the oil-based inks containing the oil constituent (solvent), which is similar to the plasticizer in the base. In order for the liquid droplets of one of the inks to have a wetting/spreading property on the fixed surface of the liquid droplets of any other of the inks, there is a need to select the kind of the colorant to be blended and the content ratios of the dispersant and solvent to be blended, in a manner that the inks concerned have a high affinity with each other. For example, when the pigment in one of the inks has a relatively low hydrophobicity and a relatively high hydrophilicity, a measure to increase the content of the dispersant to control the wetting/spreading property is taken. The measure to be taken is determined based on the relationship among the kind of the pigment, the combination of the dispersant and the solvent, and the other ink.

A method for coating inks of the present invention will be described below.

Figure 4:
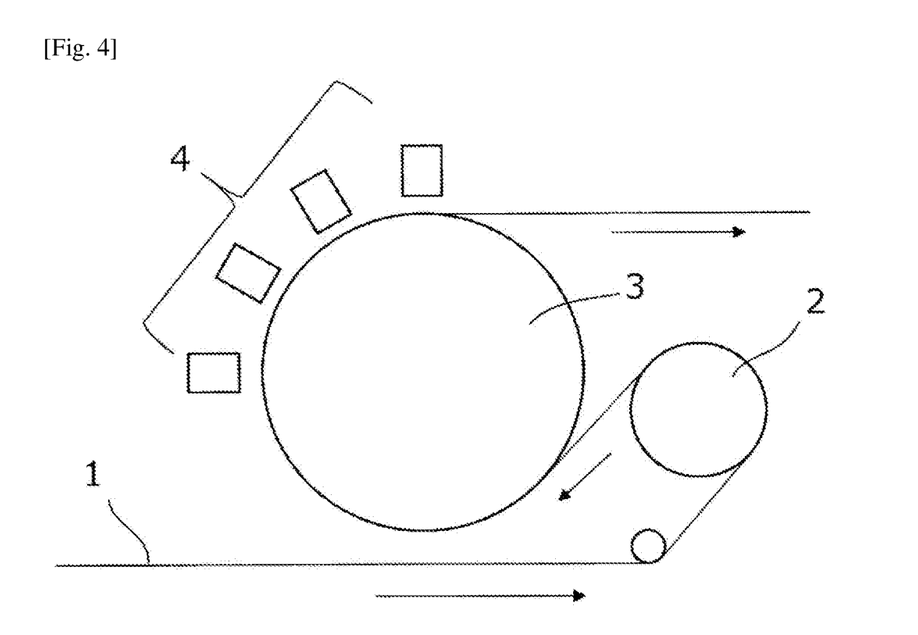
FIG. 4 is a schematic view illustrating an example of an inkjet-type ink coating apparatus used in a method for coating inks of the present invention.

FIG. 4 is a schematic view illustrating an example of an inkjet-type ink coating apparatus used in the method for coating inks of the present invention. As illustrated in FIG. 4, a target 1 including a gel layer on a base is preheated by a preheat drum 2, and then conveyed to the inkjet discharging unit 4 while being heated at a constant temperature by a heating drum 3. Here, liquid droplets of an ink discharged by the inkjet discharging unit 4 land on the target 1. In this way, a desired image can be formed.

<Step of Producing Target>

The target is obtained by forming a gel layer containing a vinyl chloride resin and a plasticizer on a base.

A method for coating the gel layer on the base is not particularly limited and may be appropriately selected depending on the intended purpose. Examples of the method include coating methods such as a knife coating method, a nozzle coating method, a die coating method, a lip coating method, a comma coating method, a gravure coating method, a rotary screen coating method, and a reverse roll coating method.

The step of producing the target may be added as a previous step before the ink coating step.

The vinyl chloride resin gelates by heating treatment after the coating, and can form a gel layer containing the plasticizer.

The temperature for gelation is preferably 150 degrees C. or higher but 190 degrees C. or lower. When the temperature is 190 degrees C. or lower, it is possible to suppress generation of a plurality of grooves in the surface along with advancement of the gelation, leading to promotion of absorbability of the inks into the gel layer and improvement of image qualities. When the temperature is 150 degrees C. or higher, it is possible to promote the gelation, suppress a printed image from being blurred, and obtain a desired image density.

A method for producing a wallpaper in the case where the target is a wallpaper will be described below.

The method for producing a wallpaper is the method for coating inks of the present invention where the target is a wallpaper. The method preferably includes a heating step and an embossing step and further includes other steps as needed.

As the case may be, the method for producing a wallpaper may include a heating step of heating a gel layer containing a foaming agent to foam the foaming agent, or may not include a heating step for foaming when a gel layer does not contain a foaming agent.

<<Ink Coating Method>>

As the ink coating method, the same method as the method for coating inks of the present invention may be used.

<<Heating Step>>

The heating step is a step of heating a gel layer containing a foaming agent to foam the foaming agent.

The heating temperature is preferably 100 degrees C. or higher but 250 degrees C. or lower.

<<Embossing Step>>

The embossing step is a step of forming a bossed-recessed pattern in the foamed gel layer of the target.

For the bossed-recessed pattern, well-known methods typically used for imparting bosses and recesses to, for example, wallpapers and decorative plates, such as embossing processing, chemical embossing processing, rotary screening processing, or flexographic printing may be selectively used.

The embossing step may employ a method of imparting bosses and recesses by processing with an embossing plate, chemical embossing processing, rotary screening, or flexographic printing.

The embossing step may employ any of a method of performing embossing with a cooling roller after heating, and a method of performing embossing in one step by hot roller embossing.

The embossing depth by the embossing processing is preferably 0.08 mm or greater but 0.50 mm or less. When the embossing depth is 0.08 mm or greater, a stereoscopic effect can be produced. When the embossing depth is 0.50 m or less, abrasion resistance on the surface can be improved.

These steps may be performed individually batch-wise, but may also be performed serially.

<<Other Steps>>

In the present invention, other steps that may be typically employed in a wallpaper producing process may be appropriately selected as needed.

Examples of the other steps include coating treatment for imparting scratch resistance.

Particularly, in the present invention, it is possible to prevent stickiness and improve a design property by providing a transparent protective layer by the coating treatment.

The transparent protective layer is not particularly limited and may be appropriately selected depending on the intended purpose. Examples of the transparent protective layer include urethane-based resins, acrylic-based resins such as polymethyl methacrylate, and fluorine-based resins such as polyvinyl fluoride resins, polyvinylidene fluoride resins, and polyethylene fluoride resins.

As needed, the other steps may be employed both before and after each of the steps of coating the inks.

(Image Forming Set)

An image forming set of the present invention is an image forming set including a target and a plurality of kinds of inks to be coated on the target by an inkjet method individually. The target includes a base and a gel layer provided on the base and containing a vinyl chloride resin and a plasticizer. The plurality of kinds of inks are oil-based inks and include an ink x and an ink y that is to be discharged after the ink x is discharged. An interpenetration ratio Pxy of the ink y to the ink x is 7.0% or greater but 13.0% or less.

As the target, the same as the target in the method for coating inks of the present invention or the method for producing a wallpaper of the present invention may be used.

As the plurality of kinds of inks, the same as the plurality of kinds of inks in the method for coating inks of the present invention may be used.

(Image Forming System)

An image forming system of the present invention includes a target, a plurality of kinds of inks, and an image forming apparatus configured to coat the plurality of kinds of inks on the target by an inkjet method individually. The target includes a base and a gel layer provided on the base and containing a vinyl chloride resin and a plasticizer. The plurality of kinds of inks are oil-based inks and include an ink x and an ink y that is to be discharged after the ink x is discharged. An interpenetration ratio Pxy of the ink y to the ink x is 7.0% or greater but 13.0% or less.

As the target, the same as the target in the method for coating inks of the present invention or the method for producing a wallpaper of the present invention may be used.

As the plurality of kinds of inks, the same as the plurality of kinds of inks in the method for coating inks of the present invention may be used.

(Ink)

An ink of the present invention is an ink that is to be coated on a target by an inkjet method and used together with an ink y. The target includes a base and a gel layer provided on the base and containing a vinyl chloride resin and a plasticizer. The ink y and the ink are oil-based inks. An interpenetration ratio Pxy of the ink y to the ink is 7.0% or greater but 13.0% or less.

Further, an ink of the present invention is an ink that is to be coated on a target by an inkjet method and used together with an ink x. The target includes a base and a gel layer provided on the base and containing a vinyl chloride resin and a plasticizer. The ink x and the ink are oil-based inks. An interpenetration ratio Pxy of the ink to the ink x is 7.0% or greater but 13.0% or less.

As the target, the same as the target in the method for coating inks of the present invention or the method for producing a wallpaper of the present invention may be used.

As the inks, the same as the plurality of kinds of inks in the method for coating inks of the present invention may be used.

(Ink Set)

An ink set of the present invention is an ink set including an ink x and an ink y to be coated on a target by an inkjet method. The target includes a base and a gel layer provided on the base and containing a vinyl chloride resin and a plasticizer. The ink x and the ink y are oil-based inks. An interpenetration ratio Pxy of the ink y to the ink x is 7.0% or greater but 13.0% or less.

As the target, the same as the target in the method for coating inks of the present invention may be used.

As the ink x and the ink y, the same as the plurality of kinds of inks in the method for coating inks of the present invention may be used.

EXAMPLES

The present invention will be more specifically described below by way of Examples. However, the present invention should not be construed as being limited to these Examples.

Target Production Example 1

<Production of Target 1>

Dioctyl phthalate as a plasticizer (available from Tokyo Chemical Industry Co., Ltd.) (50 parts by mass) and a Ba/Zn-based stabilizer for vinyl chloride as a stabilizer (available from Tokyo Chemical Industry Co., Ltd.) (3 parts by mass) were added together, stirred well, and mixed. To the resultant, an emulsion-polymerized polyvinyl chloride resin (product name: PSL-31, available from Kaneka Corporation) (100 parts by mass), azodicarboxylic amide as a defoaming agent (available from Tokyo Chemical Industry Co., Ltd.) (5 parts by mass), calcium carbonate (90 parts by mass), and titanium dioxide (15 parts by mass) were added, to obtain a mixture liquid. With a coater, the obtained mixture liquid was coated on a sheet having a mass of 80 g/m² (product name: ECOCOAT IJ80, available from Sakurai Co., Ltd.) in a coating amount of 130 g/m², and left to stand in an oven at a heating temperature of 120 degrees C. for a heating time of 90 seconds, to bring the polyvinyl chloride sol into a pre-gel state, to obtain a target (wallpaper) 1.

Target Production Example 2

<Production of Target 2>

A target (wallpaper) 2 was obtained in the same manner as in Target production example 1, except that the composition of Target production example 1 was changed to the composition presented in Table 1 below.

TABLE 1

|  |  | Target 1 (part by mass) | Target 2 (part by mass) |
| --- | --- | --- | --- |
| Vinyl chloride resin | Polyvinyl chloride resin | 100 | 100 |
| Plasticizer | Dioctyl phthalate | 50 | — |
|  | Diisononyl phthalate | — | 50 |
| Filler | Calcium carbonate | 90 | 90 |
|  | Titanium dioxide | 15 | 15 |
| Foaming agent | Azodicarboxylic amide | 5 | 5 |
| Stabilizer | Ba/Zn-based stabilizer for vinyl chloride | 3 | 3 |

TABLE 1-continued

|  |  | Target 1 (part by mass) | Target 2 (part by mass) |
| --- | --- | --- | --- |
| Heating conditions | Heating temperature (degree C.) | 120 | 120 |
|  | Heating time (second) | 90 | 90 |

Product names and supplier names of the components presented in Table 1 are as follows.

Emulsion polymerized polyvinyl chloride resin: available from Kaneka Corporation, product name: PSL-31

Dioctyl phthalate: available from Tokyo Chemical Industry Co., Ltd.

Diisononyl phthalate: available from Tokyo Chemical Industry Co., Ltd.

Calcium carbonate: available from Tokyo Chemical Industry Co., Ltd.

Titanium dioxide: available from Tokyo Chemical Industry Co., Ltd.

Azodicarboxylic amide: available from Tokyo Chemical Industry Co., Ltd.

Ba/Zn-based stabilizer for vinyl chloride: available from Tokyo Chemical Industry Co., Ltd.

<Pulse NMR Measurement>

The targets 1 and 2 were measured by heating-temperature-varied pulse NMR according to the measuring method described below.

With MINISPEC MQ series for pulse NMR available from Bruker Corporation, the targets 1 and 2 were measured according to (1) to (4) below to obtain the ratio of a hard component and a spin-spin relaxation time of a soft component by a Hahn echo method. The ratio of the hard component, and the spin-spin relaxation time of the soft component at each heating temperature are presented in Table 2 below.

(1) Sample

For being used for the measurement, the target was weighed out in 0.2 g in an NMR tube having a diameter of 10 mm and heated for 15 minutes in a preheater adjusted to the same heating temperature as in printing. Note that a sample would undergo a significant gel state change and come to have completely different properties if the sample once became higher than the set temperature and then became the predetermined temperature through cooling even though these temperatures are the same heating temperatures. Hence, it was indispensable to start heating the sample after adjusting the preheater to the predetermined temperature.

(2) Measurement Conditions

Hahn echo method

First 90° Pulse Separation; 0.01 msec

Final Pulse Separation; 20 msec

Number of Data Point for Fitting; 40 points

Cumulated number; 32 times

Temperature; the same as the heating temperature in printing (3) Method for Calculating Spin-Spin Relaxation Time ($t2$)

By exponential approximation with ORIGIN 8.5 (available from Origin Lab Corporation), a spin-spin relaxation time ($t2$) was calculated from a decay curve obtained by the Hahn echo method in the pulse NMR measurement.

(4) Method for Calculating Spin-Spin Relaxation Times (tH, tS)

The decay curve obtained by the Hahn echo method in the pulse NMR measurement was a superimposition of relaxation curves attributed to 2 components, namely the hard component having a low molecular mobility and the soft component having a high molecular mobility.

By bi-exponential approximation with ORIGIN 8.5 (available from Origin Lab Corporation), the obtained echo signal was decomposed to 2 relaxation curves attributed to the 2 components. In this way, spin-spin relaxation times (tH, tS) of the respective components were calculated.

11200 as a dispersant (available from Lubrizol Japan Limited) (5 parts by mass) were added together as a mixture, which was subjected to dispersion by mixing with a bead mill disperser, to obtain an ink 1C.

Ink Preparation Examples 2 to 30

<Preparation of Ink 2C to Ink 10C, Ink 1M to Ink 10M, and Ink 1Y to Ink 10Y>

An ink 2C to an ink 10C, an ink 1M to an ink 10M, and an ink 1Y to an ink 10Y were obtained in the same manner as in Ink preparation example 1, except that the composition of Ink preparation example 1 was changed to the compositions presented in Table 3 below.

TABLE 3

|  |  | Pigment |  | Solvent |  | Dispersant |  |
|---|---|---|---|---|---|---|---|
|  |  | Kind | Part by mass | Kind | Part by mass | Kind | Part by mass |
| Inks 1 | C | PB 15:4 | 10 | Diisononyl adipate | 85 | SOLSPERSE 11200 | 5 |
|  | M | PR 122 |  |  |  |  |  |
|  | Y | PY 185 |  |  |  |  |  |
| Inks 2 | C | PB 15:4 | 10 | Diisononyl adipate | 87 | SOLSPERSE 11200 | 3 |
|  | M | PR 122 |  |  |  |  |  |
|  | Y | PY 185 |  |  |  |  |  |
| Inks 3 | C | PB 15:4 | 10 | Diisononyl adipate | 83 | SOLSPERSE 11200 | 7 |
|  | M | PR 122 |  |  |  |  |  |
|  | Y | PY 185 |  |  |  |  |  |
| Inks 4 | C | PB 15:4 | 10 | Diisononyl adipate | 85 | SOLSPERSE 13940 | 5 |
|  | M | PR 122 |  |  |  |  |  |
|  | Y | PY 185 |  |  |  |  |  |
| Inks 5 | C | PB 15:4 | 10 | Dioctyl adipate | 85 | SOLSPERSE 11200 | 5 |
|  | M | PR 122 |  |  |  |  |  |
|  | Y | PY 185 |  |  |  |  |  |
| Inks 6 | C | PB 15:4 | 10 | Dioctyl octanoate | 85 | SOLSPERSE 11200 | 5 |
|  | M | PR 122 |  |  |  |  |  |
|  | Y | PY 185 |  |  |  |  |  |
| Inks 7 | C | PB 15:4 | 10 | Diisononyl adipate | 88 | SOLSPERSE 11200 | 2 |
|  | M | PR 122 |  |  |  |  |  |
|  | Y | PY 185 |  |  |  |  |  |
| Inks 8 | C | PB 15:4 | 10 | Diisononyl adipate | 90 | SOLSPERSE 11200 | 0 |
|  | M | PR 122 |  |  |  |  |  |
|  | Y | PY 185 |  |  |  |  |  |
| Inks 9 | C | PB 15:4 | 10 | Diisononyl adipate | 82 | SOLSPERSE 11200 | 8 |
|  | M | PR 122 |  |  |  |  |  |
|  | Y | PY 185 |  |  |  |  |  |
| Inks 10 | C | PB 15:4 | 10 | Diisononyl adipate | 80 | SOLSPERSE 11200 | 10 |
|  | M | PR 122 |  |  |  |  |  |
|  | Y | PY 185 |  |  |  |  |  |

TABLE 2

|  | Ratio (%) of hard component | Spin-spin relaxation time (ms) of soft component Heating temperature (degree C.) | | | |
|---|---|---|---|---|---|
|  |  | 100 | 110 | 120 | 130 |
| Target 1 | 37 | 29.8 | 32.2 | 37.9 | 42.3 |
| Target 2 | 37 | 21.2 | 23.8 | 29.6 | 35.8 |

Ink Preparation Example 1

<Preparation of Ink 1C>

A pigment blue 15:4 as a pigment (PB15:4, available from Toyo Color Co., Ltd.) (10 parts by mass), diisononyl adipate as a solvent (oil constituent) (available from Tokyo Chemical Industry Co., Ltd.) (85 parts by mass), SOLSPERSE Product names and supplier names of the components presented in Table 3 are as follows.

PB 15:4 (C.I. Pigment Blue15:4): available from Toyo Color Co., Ltd.

PR 122 (C.I. Pigment Red122): available from Clariant Japan Co., Ltd.

PY 185 (C.I. Pigment Yellow185): BASF Corporation

Diisononyl adipate: available from Tokyo Chemical Industry Co., Ltd.

Dioctyl adipate: available from Tokyo Chemical Industry Co., Ltd.

Dioctyl octanoate: available from Tokyo Chemical Industry Co., Ltd.

SOLSPERSE 11200: available from Lubrizol Japan Limited

SOLSPERSE 13940: available from Lubrizol Japan Limited

Examples 1 to 42 and Comparative Examples 1 to 24

The targets and inks obtained were combined as presented in Tables 4 to 6 below, and "interpenetration ratio Pxy" and "image density" were evaluated in the manners described below. The same evaluations were also performed for a case where the targets 1 and 2 were heated at 200 degrees C. after the coating step and continuously processed with an embossing roll having a matte pattern. The results are presented in Tables 7 to 9 below.

(Interpenetration Ratio Pxy)

The inks were combined in a manner to form a secondary color as presented in Tables 4 to 6 below. Liquid droplets of the inks in each of the ink combinations were dropped onto each target according to the measuring method described above, and the interpenetration ratio Pxy was obtained in the manner described below.

(1) The target was cut into a square having a size of 3 cm by 3 cm. The position of the intersection of the diagonals was measured, and the intersection of the diagonals was marked with a pencil.

(2) The target was pasted on a hot plate (apparatus name: ND-1, available from AS ONE Corporation) heated to 150 degrees C. with a heat-resistant double-face seal (product name: KAPTON No. 7602, available from Teraoka Seisakusho Co., Ltd.), and left to stand for 1 minute.

(3) Next, the ink x, which was to serve as the foundation of an image, was weighed out in 30 microliters with a micropipette (product name: NICHIPET PREMIUM 100, available from Nichiryo Co., Ltd.) and dropped onto the position marked in (1) above. After the dropped ink x was left to stand for 10 seconds, any unfixed amount of the ink x was wiped with a non-woven fabric wiper (product name: BEMCOT, available from Asahi Kasei Corporation). Then, the rim of the position to which the liquid droplet was applied was marked with a pencil.

(4) Next, the ink y (5 microliters) was dropped with a micropipette (product name: NICHIPET PREMIUM 100, available from Nichiryo Co., Ltd.) onto an arbitrary position on the circle marked as the rim of the position to which the ink x was applied. After the dropped ink y was left to stand for 10 seconds, any unfixed amount of the ink y was wiped in the same manner as in (3) above, to obtain a fixed image of the ink x and the ink y.

(5) With a confocal microscope (apparatus name: FV3000, available from Olympus Corporation) and accessory image analyzing software, the area Ax of the ink x marked with a pencil and the area Ay of the portion where the ink x and the ink y overlapped each other were measured. The area Ay was divided by the area Ax, and the obtained value was expressed in percentage, to obtain the interpenetration ratio Pxy.

(Image Density)

The targets 1 and 2 were secured to a hot plate with a heat-resistant double-face tape (product name: KAPTON No. 7602, available from Teraoka Seisakusho Co., Ltd.) and heated with the hot plate set to 150 degrees C. such that the surface temperature of each target became 130 degrees C. Next, an inkjet printer (apparatus name: IPSIO GX5500, available from Ricoh Company, Ltd.) filled with each of the inks was remodeled such that the hot plate was introduced into the ink printing portion of the inkjet printer. With the obtained image forming apparatus, a 1 cm by 1 cm color patch of a secondary color, which was blue, green, or red, was printed at 600 dpi in an image printing order presented in Tables 4 to 6 below (i.e., the ink x first and the ink y next), to obtain a solid image. In the obtained solid image, the image densities of the single colors constituting the secondary color (blue=C and M, green=C and Y, and red=M and Y) were measured with a reflective/color spectrophotometric densitometer (available from X-Rite Inc., 938). The "image density" of cyan (C), magenta (M), or yellow (Y) was evaluated according to the evaluation criteria described below. The lower value of the image densities in the image formed with each ink combination was used for the evaluation. The grade B or higher is the pass level. A high image density means that it was possible to suppress beading.

<Evaluation Criteria>

A: The image density was 1.2 or greater.

B: The image density was 0.8 or greater but less than 1.2.

C: The image density was less than 0.8.

TABLE 4

| | | Heating and embossing of target | Ink No. | Ink x (printed first) | Ink y (printed next) | Secondary color |
|---|---|---|---|---|---|---|
| Example | 1 | Not done | Inks 1 | C | M | Blue |
| | 2 | | | M | C | |
| | 3 | | | C | Y | Green |
| | 4 | | | Y | C | |
| | 5 | | | M | Y | Red |
| | 6 | | | Y | M | |
| | 7 | Done | Inks 1 | C | M | Blue |
| | 8 | | | M | C | |
| | 9 | | | C | Y | Green |
| | 10 | | | Y | C | |
| | 11 | | | M | Y | Red |
| | 12 | | | Y | M | |
| | 13 | Not done | Inks 2 | C | M | Blue |
| | 14 | | | M | C | |
| | 15 | | | C | Y | Green |
| | 16 | | | Y | C | |
| | 17 | | | M | Y | Red |
| | 18 | | | Y | M | |
| | 19 | Not done | Inks 3 | C | M | Blue |
| | 20 | | | M | C | |
| | 21 | | | C | Y | Green |
| | 22 | | | Y | C | |
| | 23 | | | M | Y | Red |
| | 24 | | | Y | M | |
| | 25 | Not done | Inks 4 | C | M | Blue |
| | 26 | | | M | C | |
| | 27 | | | C | Y | Green |
| | 28 | | | Y | C | |
| | 29 | | | M | Y | Red |
| | 30 | | | Y | M | |

TABLE 5

| | | Heating and embossing of target | Ink No. | Ink x (printed first) | Ink y (printed next) | Secondaly color |
|---|---|---|---|---|---|---|
| Example | 31 | Not done | Inks 5 | C | M | Blue |
| | 32 | | | M | C | |
| | 33 | | | C | Y | Green |
| | 34 | | | Y | C | |
| | 35 | | | M | Y | Red |
| | 36 | | | Y | M | |
| | 37 | Not done | Inks 6 | C | M | Blue |
| | 38 | | | M | C | |
| | 39 | | | C | Y | Green |
| | 40 | | | Y | C | |
| | 41 | | | M | Y | Red |
| | 42 | | | Y | M | |

TABLE 6

| | | Heating and embossing of target | Ink No. | Ink x (printed first) | Ink y (printed next) | Secondary color |
|---|---|---|---|---|---|---|
| Comparative Example | 1 | Not done | Inks 7 | C | M | Blue |
| | 2 | | | M | C | |
| | 3 | | | C | Y | Green |
| | 4 | | | Y | C | |
| | 5 | | | M | Y | Red |
| | 6 | | | Y | M | |
| | 7 | Not done | Inks 8 | C | M | Blue |
| | 8 | | | M | C | |
| | 9 | | | C | Y | Green |
| | 10 | | | Y | C | |
| | 11 | | | M | Y | Red |
| | 12 | | | Y | M | |
| | 13 | Not done | Inks 9 | C | M | Blue |
| | 14 | | | M | C | |
| | 15 | | | C | Y | Green |
| | 16 | | | Y | C | |
| | 17 | | | M | Y | Red |
| | 18 | | | Y | M | |
| | 19 | Not done | Inks 10 | C | M | Blue |
| | 20 | | | M | C | |
| | 21 | | | C | Y | Green |
| | 22 | | | Y | C | |
| | 23 | | | M | Y | Red |
| | 24 | | | Y | M | |

TABLE 7

| | | Target 1 | | | | | Target 2 | | | | |
|---|---|---|---|---|---|---|---|---|---|---|---|
| | | Pxy | Image density | | | Evaluation result | Pxy | Image density | | | Evaluation result |
| | | (%) | C | M | Y | | (%) | C | M | Y | |
| Ex. | 1 | 9.8 | 1.3 | 1.3 | — | A | 9.7 | 1.3 | 1.3 | — | A |
| | 2 | 9.7 | 1.3 | 1.3 | — | A | 9.7 | 1.3 | 1.3 | — | A |
| | 3 | 9.6 | 1.3 | — | 1.2 | A | 9.7 | 1.3 | — | 1.2 | A |
| | 4 | 9.6 | 1.4 | — | 1.2 | A | 9.8 | 1.2 | — | 1.2 | A |
| | 5 | 10.1 | — | 1.3 | 1.2 | A | 10.2 | — | 1.2 | 1.2 | A |
| | 6 | 10.0 | — | 1.3 | 1.3 | A | 10.1 | — | 1.3 | 1.3 | A |
| | 7 | 7.4 | 1.0 | 0.9 | — | B | 7.4 | 1.1 | 0.9 | — | B |
| | 8 | 7.3 | 0.9 | 0.8 | — | B | 7.3 | 0.9 | 0.8 | — | B |
| | 9 | 7.1 | 0.9 | — | 0.9 | B | 7.1 | 0.9 | — | 1.0 | B |
| | 10 | 7.4 | 1.0 | — | 0.9 | B | 7.3 | 0.8 | — | 0.9 | B |
| | 11 | 7.5 | — | 1.1 | 1.0 | B | 7.2 | — | 1.0 | 1.0 | B |
| | 12 | 7.5 | — | 1.0 | 1.0 | B | 7.5 | — | 0.9 | 0.9 | B |
| | 13 | 7.1 | 0.9 | 1.0 | — | B | 7.0 | 0.9 | 1.0 | — | B |
| | 14 | 7.3 | 1.0 | 1.0 | — | B | 7.1 | 1.0 | 1.0 | — | B |
| | 15 | 7.4 | 0.9 | — | 1.0 | B | 7.0 | 0.9 | — | 1.0 | B |
| | 16 | 7.3 | 0.9 | — | 1.0 | B | 7.1 | 0.9 | — | 1.0 | B |
| | 17 | 7.3 | — | 0.9 | 0.9 | B | 7.2 | — | 1.0 | 0.9 | B |
| | 18 | 7.2 | — | 0.9 | 0.9 | B | 7.3 | — | 0.9 | 1.0 | B |
| | 19 | 12.2 | 1.0 | 1.0 | — | B | 12.1 | 0.9 | 1.0 | — | B |
| | 20 | 12.3 | 1.0 | 1.0 | — | B | 12.3 | 1.0 | 1.0 | — | B |
| | 21 | 12.4 | 0.9 | — | 1.0 | B | 12.4 | 0.9 | — | 1.0 | B |
| | 22 | 12.8 | 1.0 | — | 1.0 | B | 12.7 | 1.0 | — | 1.0 | B |
| | 23 | 12.7 | — | 1.0 | 0.9 | B | 12.9 | — | 1.0 | 1.0 | B |
| | 24 | 12.8 | — | 1.0 | 1.0 | B | 12.9 | — | 1.0 | 1.0 | B |
| | 25 | 9.6 | 1.2 | 1.3 | — | A | 9.7 | 1.2 | 1.3 | — | A |
| | 26 | 9.8 | 1.2 | 1.3 | — | A | 10.0 | 1.2 | 1.3 | — | A |
| | 27 | 9.9 | 1.2 | — | 1.3 | A | 10.0 | 1.2 | — | 1.3 | A |
| | 28 | 9.9 | 1.3 | — | 1.2 | A | 9.9 | 1.3 | — | 1.2 | A |
| | 29 | 9.9 | — | 1.3 | 1.2 | A | 10.0 | — | 1.4 | 1.2 | A |
| | 30 | 10.2 | — | 1.3 | 1.2 | A | 10.1 | — | 1.4 | 1.2 | A |

TABLE 8

| | | Target 1 | | | | | Target 2 | | | | |
|---|---|---|---|---|---|---|---|---|---|---|---|
| | | Pxy | Image density | | | Evaluation result | Pxy | Image density | | | Evaluation result |
| | | (%) | C | M | Y | | (%) | C | M | Y | |
| Ex. | 31 | 9.8 | 1.2 | 1.3 | — | A | 9.9 | 1.4 | 1.3 | — | A |
| | 32 | 9.9 | 1.2 | 1.3 | — | A | 10.0 | 1.4 | 1.3 | — | A |
| | 33 | 9.9 | 1.2 | — | 1.3 | A | 10.0 | 1.4 | — | 1.3 | A |
| | 34 | 10.0 | 1.3 | — | 1.2 | A | 9.9 | 1.4 | — | 1.3 | A |
| | 35 | 10.2 | — | 1.1 | 1.1 | B | 10.0 | — | 1.3 | 1.3 | A |
| | 36 | 10.1 | — | 1.3 | 1.2 | A | 10.1 | — | 1.3 | 1.3 | A |
| | 37 | 9.1 | 1.3 | 1.3 | — | A | 9.2 | 1.3 | 1.3 | — | A |
| | 38 | 9.5 | 1.3 | 1.3 | — | A | 9.3 | 1.3 | 1.3 | — | A |
| | 39 | 9.4 | 1.3 | — | 1.3 | A | 9.3 | 1.2 | — | 1.3 | A |
| | 40 | 9.8 | 1.3 | — | 1.3 | A | 9.7 | 1.3 | — | 1.2 | A |
| | 41 | 9.5 | — | 1.3 | 1.3 | A | 9.6 | — | 1.3 | 1.3 | A |
| | 42 | 9.5 | — | 1.3 | 1.3 | A | 9.6 | — | 1.3 | 1.3 | A |

TABLE 9

| | | Target 1 | | | | | Target 2 | | | | |
|---|---|---|---|---|---|---|---|---|---|---|---|
| | | Pxy | Image density | | | E-valuation result | Pxy | Image density | | | Evaluation result |
| | | (%) | C | M | Y | | (%) | C | M | Y | |
| Comp. Ex. | 1 | 5.5 | 0.6 | 0.6 | — | C | 5.6 | 0.6 | 0.6 | — | C |
| | 2 | 5.4 | 0.6 | 0.6 | — | C | 5.4 | 0.6 | 0.6 | — | C |
| | 3 | 6.0 | 0.6 | — | 0.5 | C | 6.1 | 0.6 | — | 0.5 | C |
| | 4 | 5.8 | 0.6 | — | 0.5 | C | 5.8 | 0.6 | — | 0.5 | C |
| | 5 | 5.4 | — | 0.6 | 0.6 | C | 5.4 | — | 0.6 | 0.6 | C |
| | 6 | 5.4 | — | 0.6 | 0.5 | C | 5.4 | — | 0.6 | 0.5 | C |
| | 7 | 2.1 | 0.4 | 0.4 | — | C | 2.3 | 0.4 | 0.4 | — | C |
| | 8 | 2.1 | 0.4 | 0.4 | — | C | 2.5 | 0.4 | 0.4 | — | C |
| | 9 | 2.4 | 0.4 | — | 0.5 | C | 2.4 | 0.4 | — | 0.4 | C |
| | 10 | 2.3 | 0.4 | — | 0.5 | C | 2.3 | 0.4 | — | 0.4 | C |
| | 11 | 2.4 | — | 0.5 | 0.4 | C | 2.2 | — | 0.4 | 0.4 | C |
| | 12 | 2.4 | — | 0.5 | 0.4 | C | 2.1 | — | 0.4 | 0.4 | C |
| | 13 | 14.5 | 0.5 | 0.6 | — | C | 14.8 | 0.5 | 0.5 | — | C |
| | 14 | 14.6 | 0.6 | 0.6 | — | C | 14.9 | 0.5 | 0.5 | — | C |
| | 15 | 14.4 | 0.5 | — | 0.6 | C | 14.8 | 0.5 | — | 0.5 | C |
| | 16 | 14.4 | 0.5 | — | 0.5 | C | 14.8 | 0.5 | — | 0.5 | C |
| | 17 | 14.4 | — | 0.6 | 0.5 | C | 14.8 | — | 0.5 | 0.5 | C |
| | 18 | 14.7 | — | 0.6 | 0.5 | C | 14.7 | — | 0.5 | 0.5 | C |
| | 19 | 16.1 | 0.5 | 0.6 | — | C | 16.8 | 0.5 | 0.5 | — | C |
| | 20 | 16.3 | 0.5 | 0.6 | — | C | 16.8 | 0.5 | 0.5 | — | C |
| | 21 | 16.2 | 0.5 | — | 0.6 | C | 16.7 | 0.5 | — | 0.5 | C |
| | 22 | 16.2 | 0.5 | — | 0.5 | C | 16.7 | 0.5 | — | 0.5 | C |
| | 23 | 16.1 | — | 0.6 | 0.5 | C | 16.1 | — | 0.6 | 0.4 | C |
| | 24 | 16.1 | — | 0.6 | 0.5 | C | 16.0 | — | 0.5 | 0.4 | C |

From the results of Tables 7 to 9 above, it is seen that all of Examples 1 to 42 were the pass level, and that it was possible to obtain an image having a high image quality when the interpenetration ratio Pxy was in a predetermined range.

Aspects of the present invention are as follows, for example.

<1> A method for coating inks, the method including coating a plurality of kinds of inks on a target by an inkjet method individually, wherein the target includes a base and a gel layer provided on the base and containing a vinyl chloride resin and a plasticizer, wherein the plurality of kinds of inks are oil-based inks and include an ink x and an ink y that is to be discharged after the ink x is discharged, and wherein an interpenetration ratio Pxy of the ink y to the ink x is 7.0% or greater but 13.0% or less.

<2> The method for coating inks according to <1>,
wherein in all combinations of the ink x and the ink y selectable from the plurality of kinds of inks, the interpenetration ratio Pxy is 7.0% or greater but 13.0% or less.

<3> The method for coating inks according to <1> to <2>, wherein the oil-based inks are pigment inks.

<4> The method for coating inks according to any one of <1> to <3>,
wherein when a free induction decay curve obtained by measuring the target by a pulse NMR method is decomposed to 2 curves attributed to a hard component and a soft component, a ratio of the hard component is 35% or greater but 40% or less, and
wherein a spin-spin relaxation time obtained by measuring the soft component by a Hahn echo method is 30.0 ms or longer but 45.0 ms or shorter.

<5> The method for coating inks according to any one of <1> to <4>,
wherein each of the plurality of kinds of inks further contains a solvent.

<6> The method for coating inks according to any one of <1> to <5>,
wherein each of the ink x and the ink y is any one selected from the group consisting of a cyan ink, a magenta ink, and a yellow ink, and
wherein the ink x and the ink y are different colors.

<7> The method for coating inks according to any one of <1> to <6>,
wherein the interpenetration ratio Pxy is 7.5% or greater but 12.0% or less.

<8> The method for coating inks according to any one of <1> to <7>,
wherein the interpenetration ratio Pxy is 9.1% or greater but 10.2% or less.

<9> The method for coating inks according to any one of <1> to <8>,
wherein each of the plurality of kinds of inks further contains a dispersant.

<10> A method for producing a wallpaper,
wherein the method is the method for coating inks according to any one of <1> to <9> where the target is a wallpaper.

<11> The method for producing a wallpaper according to <10>,
wherein the gel layer of the wallpaper contains a foaming agent.

<12> The method for producing a wallpaper according to <11>, the method further including
a heating step of heating the wallpaper to make the foaming agent foam the gel layer.

<13> The method for producing a wallpaper according to <12>, further including after the heating step
an embossing step of forming a bossed-recessed pattern in the wallpaper.

<14> The method for producing a wallpaper according to any one of <11> to <13>,
wherein the foaming agent is azodicarboxylic acid amide.

<15> The method for producing a wallpaper according to <13> or <14>,
wherein the embossing step employs embossing processing.

<16> The method for producing a wallpaper according to <15>,
wherein an embossing depth by the embossing processing is 0.08 mm or greater but 0.50 mm or less.

<17> An image forming set including:
a target; and
a plurality of kinds of inks to be coated on the target by an inkjet method individually,
wherein the target includes a base and a gel layer provided on the base and containing a vinyl chloride resin and a plasticizer,
wherein the plurality of kinds of inks are oil-based inks and include an ink x and an ink y that is to be discharged after the ink x is discharged, and
wherein an interpenetration ratio Pxy of the ink y to the ink x is 7.0% or greater but 13.0% or less.

<18> The image forming set according to <17>,
wherein the target is a wallpaper.

<19> An image forming system including:
a target;
a plurality of kinds of inks; and
an image forming apparatus configured to coat the plurality of kinds of inks on the target by an inkjet method individually,
wherein the target includes a base and a gel layer provided on the base and containing a vinyl chloride resin and a plasticizer,
wherein the plurality of kinds of inks are oil-based inks and include an ink x and an ink y that is to be discharged after the ink x is discharged, and
wherein an interpenetration ratio Pxy of the ink y to the ink x is 7.0% or greater but 13.0% or less.

<20> The image forming system according to <19>,
wherein the target is a wallpaper.

<21> An ink
wherein the ink is an ink to be coated on a target by an inkjet method and used together with an ink y,
wherein the target includes a base and a gel layer provided on the base and containing a vinyl chloride resin and a plasticizer,
wherein the ink y and the ink are oil-based inks, and
wherein an interpenetration ratio Pxy of the ink y to the ink is 7.0% or greater but 13.0% or less.

<22> An ink
wherein the ink is an ink to be coated on a target by an inkjet method and used together with an ink x,
wherein the target includes a base and a gel layer provided on the base and containing a vinyl chloride resin and a plasticizer,
wherein the ink x and the ink are oil-based inks, and
wherein an interpenetration ratio Pxy of the ink to the ink x is 7.0% or greater but 13.0% or less.

<23> An ink set including
an ink x and an ink y that are to be coated on a target by an inkjet method,
wherein the target includes a base and a gel layer provided on the base and containing a vinyl chloride resin and a plasticizer,
wherein the ink x and the ink y are oil-based inks, and
wherein an interpenetration ratio Pxy of the ink y to the ink x is 7.0% or greater but 13.0% or less.

The method for coating inks according to any one of <1> to <9>, the method for producing a wallpaper according to any one of <10> to <16>, the image forming set according <17> or <18>, the image forming system according to <19> or <20>, the ink according to <21> or <22>, and the ink set according to <23> can solve the various problems in the related art and can achieve the object of the present invention.

REFERENCE SIGNS LIST 1, 10: target
11: ink x
12: ink y

The invention claimed is:

1. A method for coating inks, the method comprising coating a plurality of kinds of inks on a target by an inkjet method individually,
wherein the target comprises a base and a gel layer that is provided on the base and comprises a vinyl chloride resin and a plasticizer,
wherein the plurality of kinds of inks are oil-based inks and comprise an ink x and an ink y that is to be discharged after the ink x is discharged,
wherein an interpenetration ratio Pxy of the inky to the ink x is 7.0% or greater but 13.0% or less,
wherein when a free induction decay curve obtained by measuring the target by a pulse NMR method is decomposed to 2 curves attributed to a hard component and a soft component, a ratio of the hard component is 35% or greater but 40% or less, and
wherein a spin-spin relaxation time obtained by measuring the soft component by a Hahn echo method is 30.0 ms or longer but 45.0 ms or shorter.

2. The method for coating inks according to claim 1, wherein in all combinations of the ink x and the inky selectable from the plurality of kinds of inks, the interpenetration ratio Pxy is 7.0% or greater but 13.0% or less.

3. The method for coating inks according to claim 1, wherein the oil-based inks comprise pigment inks.

4. The method for coating inks according to claim 1, wherein each of the plurality of kinds of inks further comprises a solvent.

5. The method for coating inks according to claim 1, wherein each of the ink x and the inky is any one selected from the group consisting of a cyan ink, a magenta ink, and a yellow ink, and
wherein the ink x and the ink y are different colors.

6. A method for producing a wallpaper,
wherein the method is the method for coating inks according to claim 1 where the target is a wallpaper.

7. The method for producing a wallpaper according to claim 6,
wherein the gel layer of the wallpaper comprises a foaming agent.

8. The method for producing a wallpaper according to claim 7, the method further comprising
heating the wallpaper to make the foaming agent foam the gel layer.

9. The method for producing a wallpaper according to claim 8, further comprising after the heating
forming a bossed-recessed pattern in the wallpaper.

10. An image forming set comprising:
a target; and
a plurality of kinds of inks to be coated on the target by an inkjet method individually,
wherein the target comprises a base and a gel layer that is provided on the base and comprises a vinyl chloride resin and a plasticizer,
wherein the plurality of kinds of inks are oil-based inks and comprise an ink x and an ink y that is to be discharged after the ink x is discharged,
wherein an interpenetration ratio Pxy of the inky to the ink x is 7.0% or greater but 13.0% or less,
wherein when a free induction decay curve obtained by measuring the target by a pulse NMR method is decomposed to 2 curves attributed to a hard component and a soft component, a ratio of the hard component is 35% or greater but 40% or less, and
wherein a spin-spin relaxation time obtained by measuring the soft component by a Hahn echo method is 30.0 ms or longer but 45.0 ms or shorter.

11. An image forming system comprising:
a target;
a plurality of kinds of inks; and
an image forming apparatus configured to coat the plurality of kinds of inks on the target by an inkjet method individually,
wherein the target comprises a base and a gel layer that is provided on the base and comprises a vinyl chloride resin and a plasticizer,
wherein the plurality of kinds of inks are oil-based inks and comprise an ink x and an ink y that is to be discharged after the ink x is discharged,
wherein an interpenetration ratio Pxy of the inky to the ink x is 7.0% or greater but 13.0% or less,
wherein when a free induction decay curve obtained by measuring the target by a pulse NMR method is decomposed to 2 curves attributed to a hard component and a soft component, a ratio of the hard component is 35% or greater but 40% or less, and
wherein a spin-spin relaxation time obtained by measuring the soft component by a Hahn echo method is 30.0 ms or longer but 45.0 ms or shorter.

12. The method for coating inks according to claim 1, wherein the plurality of kinds of inks is coated directly on the gel layer of the target.

13. The method for coating inks according to claim 1, wherein each of the ink x and the inky comprises a dispersant in an amount of from 3 mass % to 7 mass %.

14. The image forming set according to claim 10, wherein each of the ink x and the inky comprises a dispersant in an amount of from 3 mass % to 7 mass %.

15. The image forming system according to claim 11, wherein the image forming apparatus is configured to coat the plurality of kinds of inks directly on the gel layer of the target.

16. The image forming system according to claim 11, wherein each of the ink x and the inky comprises a dispersant in an amount of from 3 mass % to 7 mass %.

* * * * *